(12) United States Patent (10) Patent No.: US 8,605,804 B2
Carbonelli et al. (45) Date of Patent: Dec. 10, 2013

(54) METHOD OF CHANNEL ESTIMATION AND A CHANNEL ESTIMATOR

(75) Inventors: Cecilia Carbonelli, Munich (DE); Stefan Franz, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 266 days.

(21) Appl. No.: 13/085,619

(22) Filed: Apr. 13, 2011

(65) Prior Publication Data

US 2012/0263245 A1 Oct. 18, 2012

(51) Int. Cl.
*H04L 27/28* (2006.01)
(52) U.S. Cl.
USPC ........... 375/260; 375/316; 375/259; 375/267; 375/285; 375/349; 375/347; 375/346
(58) Field of Classification Search
USPC ......... 375/316, 259, 260, 267, 285, 349, 347, 375/346
See application file for complete search history.

(56) References Cited

U.S. PATENT DOCUMENTS

| | | | | |
|---|---|---|---|---|
| 2004/0081074 | A1* | 4/2004 | Piechocki | 370/206 |
| 2005/0057392 | A1* | 3/2005 | Blunt et al. | 342/25 F |
| 2007/0033476 | A1 | 2/2007 | Osnato et al. | |
| 2007/0076804 | A1 | 4/2007 | Sestok, IV et al. | |
| 2010/0040154 | A1* | 2/2010 | Carbonelli et al. | 375/260 |
| 2010/0322357 | A1* | 12/2010 | Krasny et al. | 375/341 |

OTHER PUBLICATIONS

Speth, M. et al., Optimum receiver design for wireless broad-band systems using OFDM.I, IEEE Transactions on Communications, vol. 47, Issue 11, Nov. 1999, pp. 1668-1677.
3GPP TS 36.211 V1.3.2 (Sep. 2007). Section 6. 32 Pages.
H. Zhang et al., "Channel Estimation for MIMO OFDM in Correlated Fading Channels", in Proc. IEEE ICe05, May 2005.
S. Sesia et al., The UMTS Long Term Evolution: From Theory to Practice, John Wiley and Sons, Feb. 2009. pp. 169-179.
J.P. Kermoal et al., "A Stochastic MIMO Radio Channel Model With Experimental Validation", IEEE JSAC, vol. 20, No. 6, Aug. 2002.
G. Auer et al., "Pilot Aided Channel Estimation for OFDM: a Separated Approach for Smoothing and Interpolation", in Proc. IEEE ICeOs, May 2005.
M. Herdin et al., "Correlation matrix distance, a meaningful measure for evaluation of non-stationary mimo channels", in Proc. IEEE VTC 2005-Spring, vol. 1, pp. 136-140,2005.
3GPP TR 36.803. Annex B.2.2.3. 3 Pages, Apr. 2008.

\* cited by examiner

*Primary Examiner* — Siu Lee
(74) *Attorney, Agent, or Firm* — Eschweiler & Associates, LLC (57) ABSTRACT

The method includes receiving a signal comprising a symbol-carrier matrix, the symbol-carrier matrix including a predetermined pattern of pilot symbols, and determining first channel estimates at pilot symbol positions of the pilot symbols in the symbol-carrier matrix. The method further includes correcting the first channel estimates at the pilot symbol positions using Bayesian estimation, and determining second channel estimates at symbol positions other than the pilot symbol positions using interpolation based on the correct first channel estimates.

28 Claims, 6 Drawing Sheets

METHOD OF CHANNEL ESTIMATION AND A CHANNEL ESTIMATOR

FIELD

This invention relates to a method of channel estimation and a channel estimator.

BACKGROUND

Orthogonal frequency division multiplexing (OFDM) multi-carrier modulation wireless radio transmission systems can be configured based on transmitters and receivers capable of transmitting and receiving multiple carrier data signals. One example of a multiple carrier radio transmission system is Orthogonal Frequency Division Multiplexing (OFDM) in which an OFDM transmitter broadcasts information consisting of symbols containing a plurality of equally spaced carrier frequencies. The characteristics of the wireless communication channel typically vary over time due to changes in the transmission path. For demodulating OFDM modulated data in the presence of substantial time variations of the transmission channel, knowledge of the transmission channel frequency response is required. This necessitates that the receiver provides an appropriate channel estimate of the transmission channel.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

DETAILED DESCRIPTION

The aspects and embodiments are described with reference to the drawings, wherein like reference numerals are generally utilized to refer to like elements throughout. In the following description, for purposes of explanation, numerous specific details are set forth in order to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form in order to facilitate describing one or more aspects of the embodiments. It is to be understood that other embodiments may be utilized and structural or logical changes may be made without departing from the scope of the present invention.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

The apparatuses and methods as described herein are utilized as part of and for radio transmission systems, namely for systems operating in the Orthogonal Frequency Division Multiplex (OFDM) mode. The apparatuses disclosed may be embodied in baseband segments of devices used for the transmission or reception of OFDM radio signals, in particular transmitters like base stations or relay stations and receivers like mobile phones, hand-held devices or other kinds of mobile radio receivers. The described apparatuses may be employed to perform methods as disclosed herein, although those methods may be performed in any other way as well.

The following description may be read in connection with any kind of multiple carrier radio transmission systems, in particular any mobile communications systems employing multiple carrier modulation, such as, for example, the Universal Mobile Telecommunications System (UMTS) Standard or the Long Term Evolution (LTE) Standard.

The following description may also be read in connection with multiple carrier radio transmission systems in the field of digital video broadcasting (DVB-T/H) which is based on terrestrial transmitters and a communication system design adapted for mobile or hand-held receivers. However, also other communications systems, for example, satellite OFDM systems, may benefit from the concepts and principles outlined herein.

The methods and apparatuses as described herein may be utilized with any sort of antenna configurations employed within the multiple carrier radio transmission system as described herein. In particular, the concepts presented herein are applicable to radio systems employing a arbitrary number of transmit and/or receive antennas, that is Single Input Single Output (SISO) systems, Single Input Multiple Output (SIMO) systems, Multiple Input Single Output (MISO) systems and Multiple Input Multiple Output (MIMO) systems.

Figure 1:
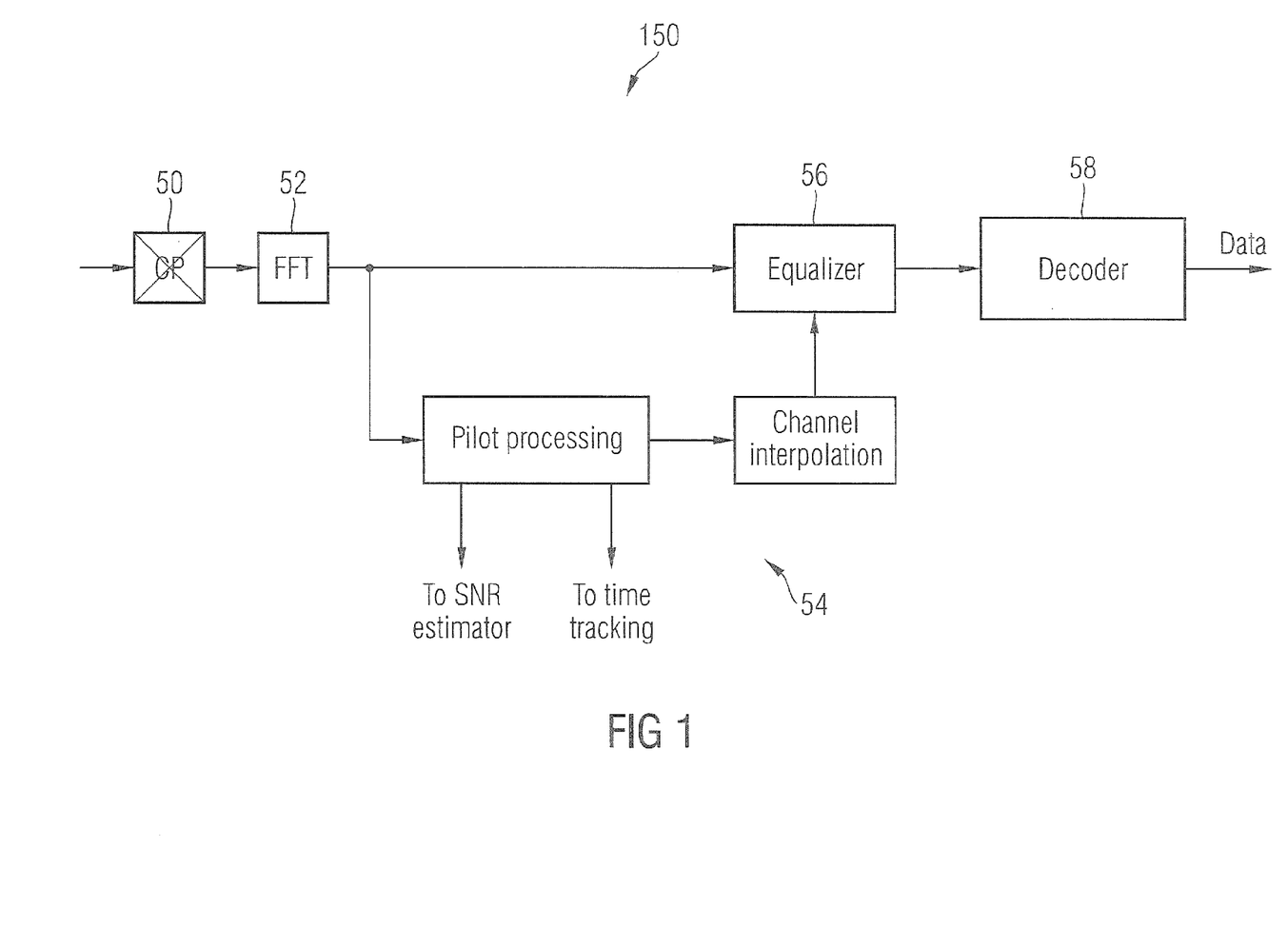
FIG. 1 shows a schematic block representation of a receiver.

Referring to FIG. 1, there is shown a schematic block representation of a receiver which may demodulate and decode OFDM multi-carrier transmission signals. The receiver 100 may include a baseband processor for carrying out the different functions as shown in FIG. 1. The baseband processor removes the cyclic prefix (CP) at 50, transforms the signal into the frequency domain using a fast Fourier transform (FFT) 52 and performs channel estimation 54, equalization 56, and turbo channel decoding 58. We consider an OFDM system with N sub-carriers and L OFDM symbols per slot. Assuming perfect synchronization, the complex baseband representation of the received signal $y_{k,l}$ for sub-carrier k and OFDM symbol l reduces to:

$$y_{k,l} = x_{k,l} H_{k,l} + z_{k,l}, \; k=1,\ldots,N \; l=1,\ldots,L \quad (1)$$

where $x_{k,l}$, $H_{k,l}$ and $z_{k,l}$ denote the transmitted symbol with energy per symbol $E_s$, the channel transfer function sample and the additive white Gaussian noise with zero mean and variance $N_0$, respectively.

Figure 2A:
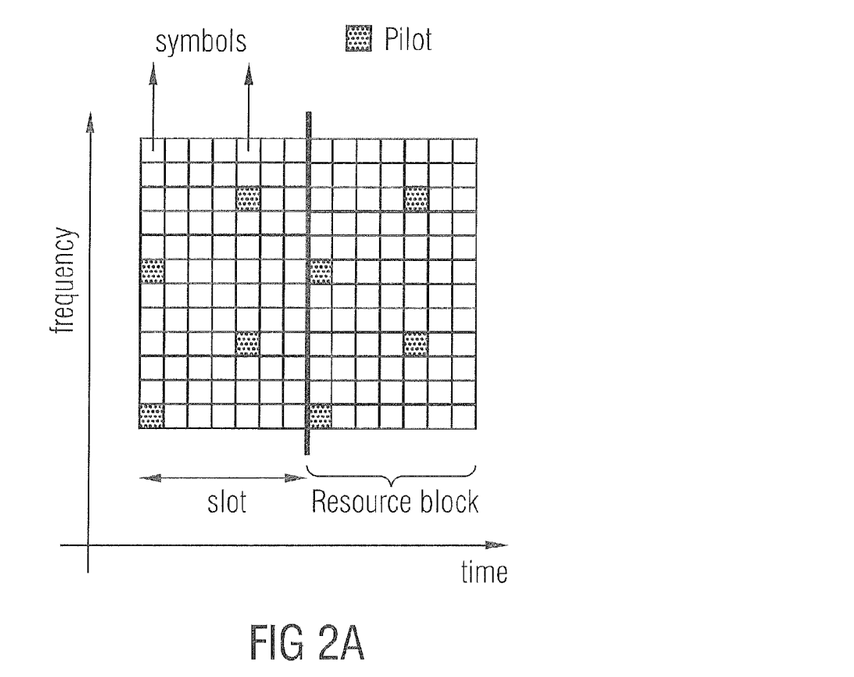
FIGS. 2a and 2b schematically illustrate a symbol-carrier matrix for a Single Input Single Output (SISO) antenna configuration, and symbol-carrier matrices for a Multiple Input Multiple Output (MIMO) antenna configuration, respectively.
Figure 2B:
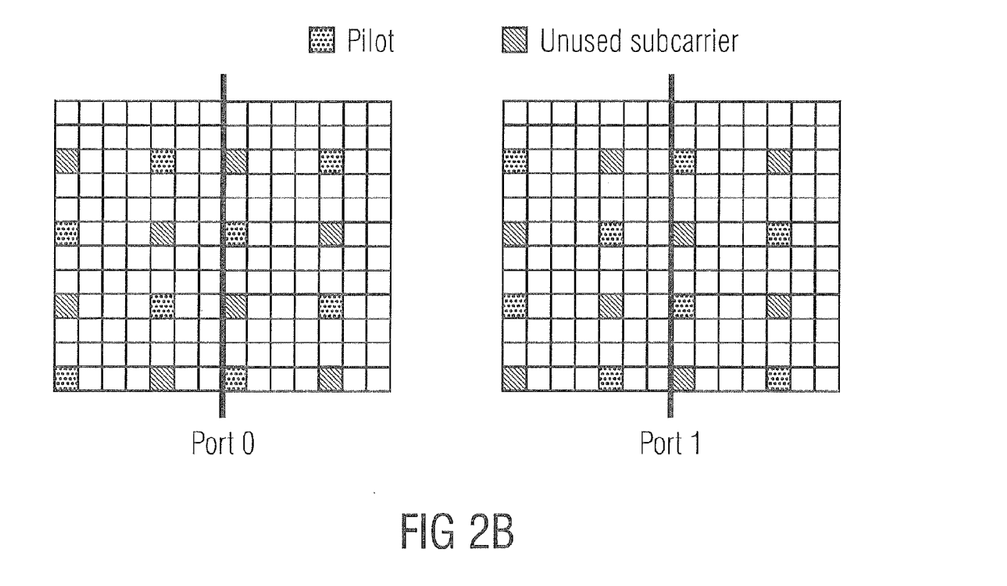

Referring to FIGS. 2a and 2b, there is shown a schematic representation of a symbol-carrier matrix for a SISO configuration (FIG. 2a) and for a MIMO 2×2 configuration (FIG. 2b). In order to facilitate channel estimation, known symbols, called pilots, are inserted at specific locations in the time-frequency grid of the symbol-carrier matrix. The resulting two-dimensional pilot pattern is shown in FIG. 2a in a case where the pilot spacing in frequency direction equals six OFDM symbols, while in time direction there are two OFDM symbols per slot containing pilots, at a distance of 4 and 3 OFDM symbols from one another.

Channel estimates are first obtained at the pilot positions based on the received signal at the pilot positions. The remaining channel coefficients at symbol position other then the pilot symbol positions are then calculated using interpolation techniques in both the time and frequency directions. The initial estimates at pilot positions can also be fed to other blocks within the receiver, e.g. to the signal-to-noise (SNR) estimator, or to a fine time tracking unit, etc. Thus, the quality of these channel estimates significantly affects the accuracy of other estimated parameters.

FIG. 2b illustrates the pilot grid for a 2×2 antenna configuration. When antenna port 0 is transmitting its pilot symbols, the other antenna is silent. This implies that pilot transmissions from the two antenna ports are completely orthogonal, i.e. MIMO channel estimation is a straightforward extension of SISO channel estimation techniques.

Prior to using interpolating techniques in order to obtain an estimate of the channel at an arbitrary symbol position a pilot processing based on the received signal at the pilot positions is carried out. The pilot processing can be simply a demodulation operation using simple least squares (LS) demodulation which for PSK (Phase Shift Keying) modulation reduces to $$\hat{H}_{k,l} = y_{k,l} x_{k,l}^*, \; \{k,l\} \in P \quad (2)$$

where P is the set of all pilot locations. As can be seen from the above equation, the pilot processing is carried out on a per sub-carrier basis and has therefore low computational complexity.

Once the channel estimate at the pilot positions is known, interpolation techniques can be applied to estimate the remaining channel coefficients at symbol positions other than the pilot symbol positions based on the channel estimates at the two-dimensional pilot grid. Among these interpolation techniques are, for example, the 2D and the 2×1D Wiener interpolation. Both 2D and 2×1D interpolation techniques rely on minimal a priori channel knowledge. Within these techniques uniform Doppler and delay power spectra are assumed, where the limits ($f_{max}$, $\tau_{max}$) can be fixed to the maximum Doppler bandwidth $B_D = 2f_D$ (where $f_D$ is the maximum channel Doppler frequency) and to the cyclic prefix length $T_{CP}$, respectively. This allows one to pre-compute the interpolation coefficients offline so that only multiplications by real-valued coefficients and summation operations are required in real time. For the 2×1D approach the Wiener (Minimum Mean Square Estimation, MMSE) coefficients are obtained as follows:

Frequency direction: $w_f(k)^T = \lfloor w_{f,1}(k), \ldots, w_{f,N_f}(k) \rfloor = r_f(k)^T R_f^{-1}, k \in F \quad (3)$ Time direction: $w_t(l)^T = \lfloor w_{t,1}(l), \ldots, w_{t,N_t}(l) \rfloor = r_t(l)^T R_t^{-1}, l \in T \quad (4)$ where F is the set of sub-carriers and T is the set of reference symbols where interpolation has to be carried out. For the 2D case the Wiener (MMSE) coefficients are obtained as $$w_{ft}(k,l)^T = \lfloor w_{ft,1}(k,l), \ldots, w_{ft,N_f}(k,l) \rfloor = r_{ft}(k,l)^T R_{ft}^{-1}(k,l) \; \in FT \quad (5)$$

where FT is the set of sub-carriers and reference symbols where interpolation has to be carried out. The elements of the cross-correlation and auto-correlation matrices in (3)-(5) can be expressed in terms of si functions.

Figure 3:
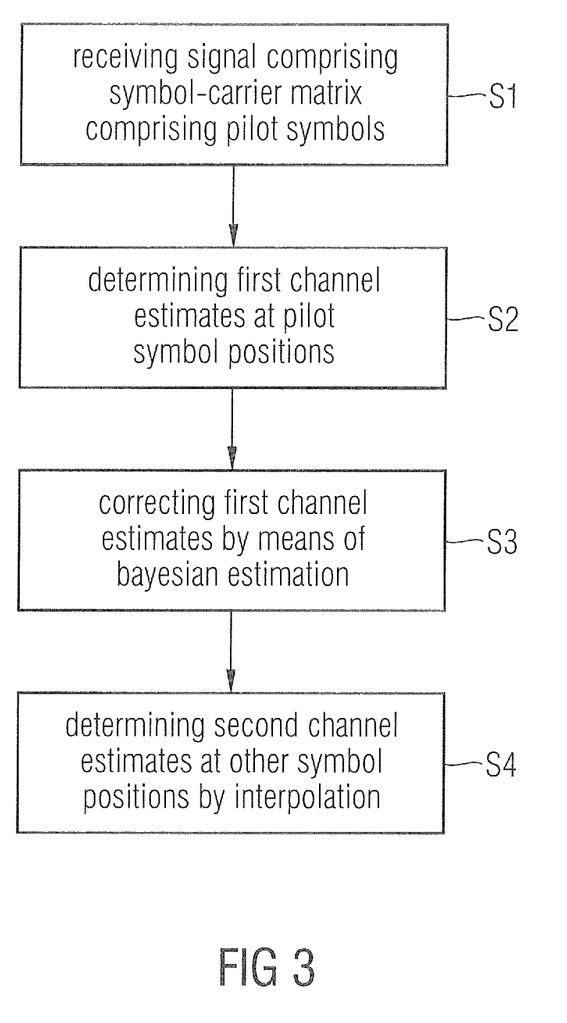
FIG. 3 shows a flow diagram of a method of channel estimation for a multiple carrier radio transmission system according to an embodiment.

Referring to FIG. 3, there is shown a flow diagram of a method of channel estimation for a multiple carrier radio transmission system according to an embodiment. The method comprises receiving a signal comprising a symbol-carrier matrix, the symbol-carrier matrix comprising a predetermined pattern of pilot symbols at s1, and determining first channel estimates at pilot symbol positions of the pilot symbols in the symbol-carrier matrix at s2. The method further comprises correcting the first channel estimates at the pilot symbol positions by means of Bayesian estimation at s3, and determining second channel estimates at symbol positions other than the pilot symbol positions by means of interpolation based on the corrected first channel estimates at s4.

It is one advantageous aspect of the method of channel estimation according to FIG. 1 that the first channel estimates at the pilot symbol positions can be improved by correcting them based on a Bayesian estimation. The least squares method as given in the above equation (2), despite its simplicity, does not provide very accurate estimates at the pilot positions, particularly in the low signal-to-noise ratio (SNR) regime. The method of channel estimation according to FIG. 1 aims at improving the channel estimation performance without increasing significantly the "real time complexity", i.e. the complexity of the operations that have to be computed in real time. With the more optimal pilot processing the demodulation performance of the 2×1D or 2D Wiener channel estimator is significantly improved without a significant increase in complexity. Similarly, the performance of all those blocks which rely on the channel estimates at pilot positions will also benefit from the proposed approach.

According to an embodiment of the method using FIG. 1, the method further comprises calculating a signal-to-noise ratio of the received signal.

According to an embodiment of the method using FIG. 1, the transmission system comprises at least two transmission antennas or at least two reception antennas and the method further comprises selecting a spatial correlation matrix out of a set of predefined spatial correlation matrices, and employing the selected spatial correlation matrix in the Bayesian estimation. According to a further embodiment thereof, the method further comprises calculating correlation coefficients representing spatial correlations between the at least two transmission antennas and/or the at least two reception antennas.

According to an embodiment the spatial correlation matrix is selected based on the calculated correlation coefficients, in particular based on whether the calculated correlation coefficients are above or below one or more predetermined threshold values. According to another embodiment the spatial correlation matrix is first determined based on the calculated correlation coefficients, and afterwards a smaller spatial correlation matrix is selected according to a desired complexity of the Bayesian estimation.

According to an embodiment of the method using FIG. 1, the transmission system comprises only one transmission antenna and only one reception antenna and the method further comprises selecting a frequency correlation matrix out of a set of predefined frequency correlation matrices, and employing the selected frequency correlation matrix in the Bayesian estimation. According to an embodiment thereof, the method further comprises calculating a signal-to-noise ratio of the received signal. According to a further embodiment thereof, the method further comprises selecting the frequency correlation matrix based on the determined signal-to-noise ratio, in particular based on whether the calculated signal-to-noise ratio is above or below one or more predetermined threshold values.

Thus, the quality of the channel estimates at the pilot positions are improved by making use of the knowledge of correlation properties, that is either spatial correlation in the case of multiple antennas, at the transmission and/or the reception side, or frequency correlation in the case of a single antenna at the transmission and the reception side, respectively.

Figure 4:
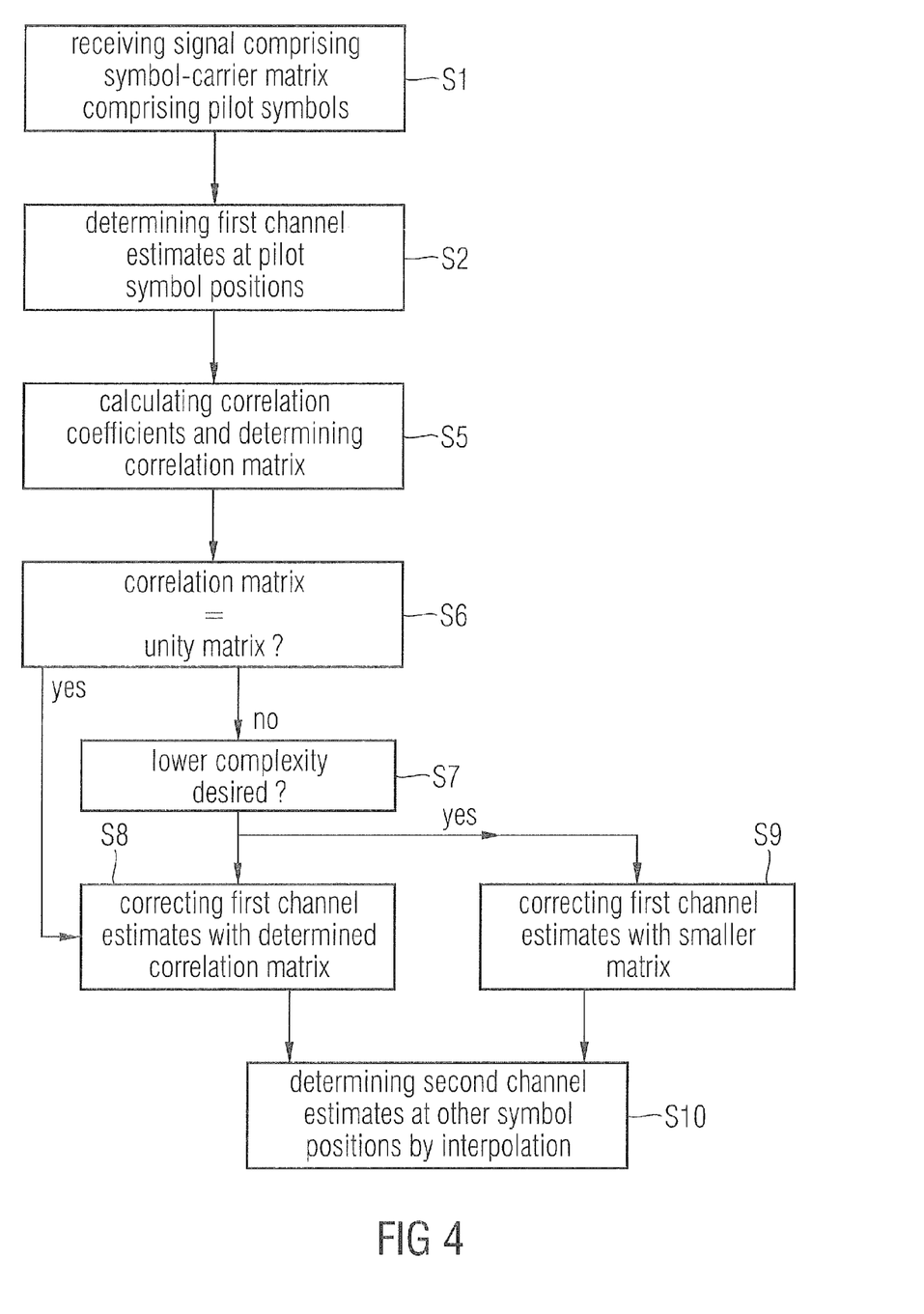
FIG. 4 shows a flow diagram of a method of channel estimation for a multiple carrier radio transmission system according to an embodiment.

Referring to FIG. 4, there is shown a flow diagram of a method of channel estimation for a multiple carrier radio transmission system according to an embodiment wherein the transmission system comprises at least two transmission antennas or at least two reception antennas. The method comprises receiving a signal comprising a symbol-carrier matrix, the symbol-carrier matrix comprising a predetermined pattern of pilot symbols at s1, and determining first channel estimates at pilot symbol positions of the pilot symbols in the symbol-carrier matrix at s2. The method further comprises calculating correlation coefficients representing spatial correlations between the at least two transmission antennas and/or the at least two reception antennas and determining a spatial correlation matrix out of a set of predefined spatial correlation matrices in dependence on the calculated correlation coefficients at s5, and determining whether the correlation matrix is the unity matrix at s6. If at s6 it is found that the correlation matrix is not the unity matrix, then it is determined whether lower complexity of the subsequent calculation process is needed at s7. If at s7 it is found that no lower complexity is needed the first channel estimates at the pilot symbol positions will be corrected using Bayesian estimation based on the determined spatial correlation matrix at s8). If at s6 it is found that the correlation matrix is the unity matrix, then the flow goes directly to s8. If at s7 it is found that a lower complexity is needed, the first channel estimates at the pilot symbol positions will be corrected by means of Bayesian estimation based on a smaller matrix than the determined spatial correlation matrix at s9). Finally, second channel estimates will be determined at symbol positions other than the pilot symbol positions using interpolation based on the corrected first channel estimates at s10.

According to an embodiment of the method of FIG. 4, the method further comprises calculating a signal-to-noise ratio of the received signal.

In the following another embodiment of a method of channel estimation for a multiple carrier radio transmission system will be outlined, and comprises the following.

(1) In the MIMO case, we only need to assess whether we are in a high, medium or low correlated scenario (through the preliminary computation of a correlation coefficient). Once this is known the corresponding pre-computed MMSE estimation matrix will be applied (depending also on the SNR level). In a special form of a low correlated scenario, namely in a low correlated scenario in which there is low correlation between the transmission antennas and also between the reception antennas, the approach as follows in (2) can then be taken.

(2) In the SISO case, the MMSE estimation matrix is also pre-computed based on the SNR level and, potentially, on the delay spread estimate if available. However, using the guard interval length will be sufficient to provide good performance in case no delay spread estimate is available.

In terms of complexity, note that, from the facts above it is clear that no online matrix inversion is required as it is typically the case for MMSE estimators relying on the exact knowledge of the channel statistics. Instead a matrix-vector multiplication is carried out, where the matrices are computed off line for different SNRs and correlation coefficients, and where the size of the vector/matrix depends on the number of pilots (from 12 to 200).

Finally, it should be noted that the proposed approach will be typically applied in a 'steady state' regime, that is, after some basic side information on the channel statistics (e.g. spatial correlation coefficient, SNR) has been gathered using the conventional approach.

1) Description of the Algorithm

According to a further embodiment of a method of channel estimation for a multiple carrier radio transmission system the various steps can be summarized as follows:

(1) Scenario detection: compute the correlation coefficients for transmit and receive antenna and apply corresponding threshold values. At this point, we have the 3 following possibilities or scenarios:

(2) MIMO: a high or medium spatial correlation at both transmit and receive antenna is detected. Then, based on the correlation coefficient in 1) and on the SNR, select the corresponding estimation matrix and apply the 'robust' MMSE estimator as detailed in below Section 2a (and 2c).

(3) SIMO: a high or medium spatial correlation at the receive antenna is detected or lower complexity is desired. Then, we separate the processing at the transmit antennas and based on the correlation coefficient in above step (1) and on the SNR, select the corresponding estimation matrix and apply the 'robust' MMSE estimator as detailed in below Section 2b (and 2c).

(4) SISO: a special form of a low correlation scenario is detected in which there is low correlation between the transmission antennas and also between the reception antennas. Then, based on the SNR, apply a SISO approach, select the corresponding frequency estimation matrix and apply the 'robust' MMSE estimator as detailed in below Section 2c.

It is to be noted that in the preliminary sections the estimation matrices in above steps (2) and (3) were selected out of a very small set based on only 3 hypothesis on the transmit and receive spatial correlation (low, medium, high). However, better performance can be achieved if a finer resolution is used for the correlation coefficient when it comes to choose the MMSE estimation matrix and after the initial decision in above step (1) is taken.

In order to derive the expression for the improved pilot estimator, one first needs to pre-process the received pilot samples in the frequency domain in order to obtain an equation of the type:

$$z = Ah + n$$

leading to the expression for the estimator:

$$\hat{h} = Qz = CA^H(ACA^H + \sigma^2 I)^{-1}z$$

where z is the vector of the received samples at pilot positions after demodulation. This equalization can be considered as a generalization of equation (13) shown further below. In some cases A might be the identity matrix (cf. the SISO case shown further below) and C is the correlation matrix (in its different forms shown further below). Specifically, for z, one can consider the full pilot set for the given bandwidth, stacking the contribution of the different receive (SIMO) and transmit/receive antennas (MIMO). Alternatively, one could work with overlapping or adjacent windows of samples for complexity reduction. Vector h in the equation above could be the channel impulse response vector (time domain approach) or the frequency response vector (frequency domain approach). The specific structure of the LTE pilot pattern allows for both approaches, the choice for one of the two methods (time or frequency) will depend on the desired complexity/performance tradeoff as discussed in the following sections. The new and common feature of the suite of algorithms developed in this invention is a 'robust' approach in modeling the above correlation matrix C so as to avoid the online computation of the matrix inverse in the expression of the estimator.

In the following detailed equations for the different variants of the proposed estimator are provided.

2a) MIMO Case (Time Domain)

We begin by illustrating the improved processing for the MIMO case (step 2) according to the time domain approach. Consider the received signal at the generic sub-carrier k and k'=k+3. Because of the orthogonality of the TX pilot pattern, we need to consider 2 sub-carrier indexes in order to be able to incorporate in one equation the effects of both TX antennae. Denoting by z(k, k') the vector of the demodulated symbols corresponding to the different receive and transmit antennas (note the different carrier index), we have:

$$z(k, k') = \begin{bmatrix} h_{11}(k) \\ h_{21}(k) \\ h_{12}(k') \\ h_{22}(k') \end{bmatrix} + \begin{bmatrix} n_1(k) \\ n_2(k) \\ n_1(k') \\ n_2(k') \end{bmatrix} = h_f(k, k') + n(k, k') \quad (6)$$

In equation (6) $h_{i,j}(k)$ represents the channel coefficient between the j-th TX antenna and the i-th RX antenna at the generic sub-carrier k, and $n_i(k)$ is the noise sample at the i-th RX antenna after demodulation. Note that the frequency coefficients are related to the channel taps in the time domain through the following relation:

$$h_f(k, k') = \begin{bmatrix} h_{11}(k) \\ h_{21}(k) \\ h_{12}(k') \\ h_{22}(k') \end{bmatrix} = \sum_{l=0}^{L-1} \begin{bmatrix} h_{11}^t(l)e^{-j2\pi lk/N} \\ h_{21}^t(l)e^{-j2\pi lk/N} \\ h_{12}^t(l)e^{-j2\pi lk'/N} \\ h_{22}^t(l)e^{-j2\pi lk'/N} \end{bmatrix} \quad (7)$$

where N is the FFT size. We now further elaborate on (6) so as to bring the expression of the received samples in a form which allows for a simple derivation of the MMSE estimator of the time domain channel coefficients $\{h_{ij}^t(l)\}$. Specifically, we rewrite equation (3) in a more compact form, that is:

$$h_f(k, k') = \begin{bmatrix} h_{11}(k) \\ h_{21}(k) \\ h_{12}(k') \\ h_{22}(k') \end{bmatrix} \quad (8)$$

$$= \sum_{l=0}^{L-1} \underbrace{\begin{bmatrix} e^{-j2\pi lk/N} & 0 & 0 & 0 \\ 0 & e^{-j2\pi lk/N} & 0 & 0 \\ 0 & 0 & e^{-j2\pi lk'/N} & 0 \\ 0 & 0 & 0 & e^{-j2\pi lk'/N} \end{bmatrix}}_{D_l(k,k')} \underbrace{\begin{bmatrix} h_{11}^t(k) \\ h_{21}^t(k) \\ h_{12}^t(k') \\ h_{22}^t(k') \end{bmatrix}}_{h_t}$$

$$= D(k, k')h_t$$

with $$D(k, k') = [D_0(k, k'), \ldots, D_{L-1}(k, k')], \quad (9)$$

$$h_t = \begin{bmatrix} h_0 \\ \vdots \\ h_{L-1} \end{bmatrix}$$

obtaining $$z(k, k') = D(k, k')h_t + n(k, k') \quad (10)$$

Finally, we stack $N_w$ (with $N_w$ being the window size) vectors z(k, k') in a longer vector z obtaining:

$$z = \begin{bmatrix} z(k_0, k_0 + 3) \\ \vdots \\ z(k_{N_w-1}, k_{N_w-1} + 3) \end{bmatrix} = Dh_t + n \quad (11)$$

with:

$$D = \begin{bmatrix} D(k_0, k_0 + 3) \\ \vdots \\ D(k_{N_w-1}, k_{N_w-1} + 3) \end{bmatrix}, n = \begin{bmatrix} n(k_0, k_0 + 3) \\ \vdots \\ n(k_{N_w-1}, k_{N_w-1} + 3) \end{bmatrix} \quad (12)$$

where $k_i$ indicate the pilot sub-carriers of TX antenna 1 and $k_i+3$ the pilot sub-carriers of TX antenna 2.

Given the model in (11) and using the MMSE orthogonality principle, we can derive the following expression for a MMSE based pilot estimator which accounts for the correlation among TX and RX antennae:

$$\hat{h}_t = Q_{MIMO}z = C_{MIMO}D^H(DC_{MIMO}D^H + \sigma^2 I)^{-1}z \quad (13)$$

where $C_{MIMO} = E\{h_t h_t^H\}$ is the correlation matrix of the channel impulse response. It should be noted that $Q_{MIMO}$ depends on the signal-to-noise ratio (SNR) as is apparent at the term $\sigma^2 I$, so if one wants to take the SNR into account, it has to be measured and introduced into the equation as shown above. Assuming $h_{ij}(k') \approx h_{ij}(k)$, which corresponds to assuming a constant channel in the frequency direction, at least for spacings in the order of 3 sub-carriers, we can express $c_h$ as [6]:

$$C_{MIMO} = \text{diag}(R_{T,0} \otimes R_{R,0}, \ldots, R_{T,L-1} \otimes R_{R,L-1}) \quad (14)$$

$$= \begin{bmatrix} R_T \otimes R_R & & \\ & \ddots & \\ & & R_T \otimes R_R \end{bmatrix}$$

$$R_T = \begin{bmatrix} \rho_{11}^T & \rho_{12}^T \\ \rho_{21}^T & \rho_{22}^T \end{bmatrix}, R_R = \begin{bmatrix} \rho_{11}^R & \rho_{12}^R \\ \rho_{21}^R & \rho_{22}^R \end{bmatrix} \quad (15)$$

$$\rho_{ij}^T = E\{h_{in}^t (h_{jn}^t)^*\} = E\{h_{in}^f (h_{jn}^f)^*\}, \quad (16)$$
$$\rho_{ij}^R = E\{h_{mi}^t (h_{mj}^t)^t\} = E\{h_{mi}^f (h_{mj}^f)^t\}$$

where we have used the following observations
a) the correlation matrix is the same for different channel taps,
b) the correlation matrix for each tap can be expressed as the Kronecker product of the TX and RX correlation matrix,
c) the RX/TX correlation factors are independent from the TX/RX antenna element.

The frequency domain channel estimate is then finally obtained as $$\hat{h}_f = D \cdot Q_{MIMO} z = P_{MIMO} z \quad (17)$$

The dimensions of the matrix product $P_{MIMO}$ is given by $4N_W \times 4N_V$, $N_W$ and $N_V$ being window sizes.

Figure 5:
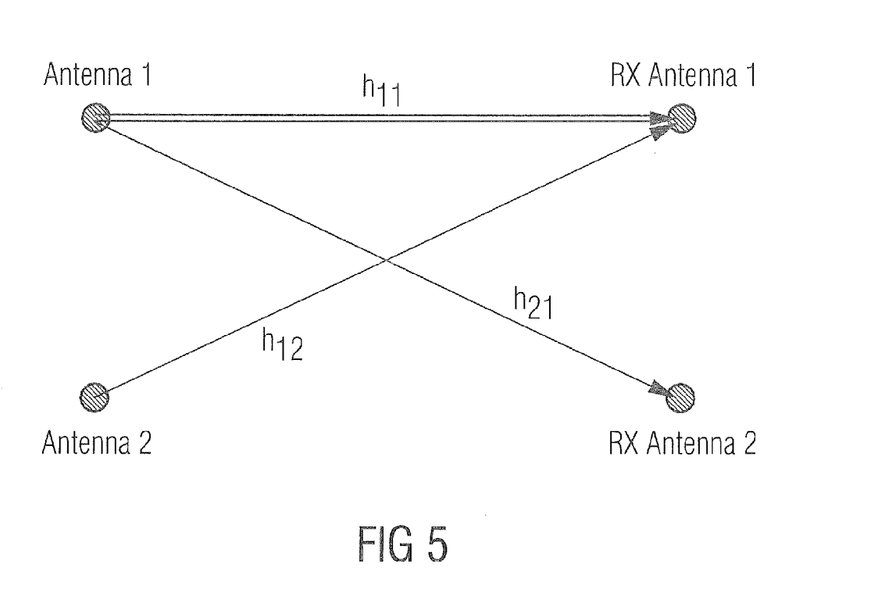
FIG. 5 shows a schematic representation of a 2×2 antenna configuration.

Recall that RX (TX) correlation tries to identify the correlation between $h_{11}$ and $h_{21}$ ($h_{11}$ and $h_{12}$) as shown in FIG. 5. Similarly, one could also take the correlation between $h_{22}$ and $h_{21}$ ($h_{22}$ and $h_{12}$). In Equation (32) below we tried to use both possibilities by averaging both results.

2b) SIMO Case (Time Domain)

At this point we observe that, because of the orthogonality of the transmitting antennae at the pilot positions, the expression of the received samples above is a function of 2 frequency indices, k and k' with a spacing of 3 sub-carriers. We can then separate the signal model into 2 smaller SIMO models, one for each transmitting antenna. This is a viable option when low correlation at the transmit antennas is detected or when lower complexity is desired. Considering only RX correlation we obtain:

$$z(k) = \begin{bmatrix} z_k^i \\ z_k^j \end{bmatrix} = \begin{bmatrix} h_{11}(k) \\ h_{21}(k) \end{bmatrix} + \begin{bmatrix} n_1(k) \\ n_2(k) \end{bmatrix} = h_f(k) + n(k) \quad (18)$$

$$h_f(k) = \begin{bmatrix} h_{11}(k) \\ h_{21}(k) \end{bmatrix} \quad (19)$$

$$= \sum_{l=0}^{L-1} \begin{bmatrix} h_{11}^t(l) e^{-j2\pi lk/N} \\ h_{21}^t(l) e^{-j2\pi lk/N} \end{bmatrix}$$

$$= \sum_{l=0}^{L-1} \begin{bmatrix} h_{11}^t(l) \\ h_{21}^t(l) \end{bmatrix} e^{-j2\pi lk/N}$$

$$= [e^{-j2\pi 0k/N} I_{2\times 2}, \ldots, e^{-j2\pi (L-1)k/N} I_{2\times 2}] \begin{bmatrix} h_{11}^t(0) \\ h_{21}^t(0) \\ \vdots \\ h_{11}^t(L-1) \\ h_{21}^t(L-1) \end{bmatrix}$$

$$= D(k) h_t$$

The received sample at sub-carrier k can then be expressed as:

$$z(k) = \begin{bmatrix} z_k^i \\ z_k^j \end{bmatrix} = D(k) h_t + \begin{bmatrix} n_1(k) \\ n_2(k) \end{bmatrix} = D(k) h_f(k) + n(k) \quad (20)$$

Staking again $N_W$ received samples in a vector we have:

$$z = \begin{bmatrix} D(k_0) \\ \vdots \\ D(k_{N_W-1}) \end{bmatrix} h_t + n = D h_t + n \quad (21)$$

The approach in (17)-(20) implies that we are ignoring the correlation among transmit antenna and we expect to obtain a better channel estimate by exploiting only the correlation at the receive antennae.

Based on (21) we can now derive the expression for a MMSE based pilot estimator which accounts only for the correlation at the RX antennae, obtaining:

$$\hat{h}_t = Q_{SIMO} z = C_{SIMO} D^H (D C_{SIMO} D^H + \sigma^2 I)^{-1} z \quad (22)$$

with $$C_{SIMO} = \begin{bmatrix} R_R & & \\ & \ddots & \\ & & R_R \end{bmatrix} \quad (23)$$

It should be noted that $Q_{SIMO}$ depends on the signal-to-noise ratio (SNR) as is apparent at the term $\sigma^2 I$, so if one wants to take the SNR into account, it has to be measured and introduced into the equation as shown above. The frequency domain channel estimate is then obtained as $$\hat{h}_f = D \cdot Q_{SIMO} z = P_{SIMO} z \quad (24)$$

The dimensions of the matrix product $P_{SIMO}$ is given by $2N_p \times 2N_p$.

The question is now how two compute the correlation matrices (Equations (14) and (23)) which appear in both estimator equations above. It may be possible, for example, to proceed by using the estimated channel coefficients and compute numerically the coefficients in (16) using, for example, the channel estimates.

At this point one can make a further simplification in order to avoid the computation of the correlation matrix. Specifically, one can take a 'robust' approach in allowing only one out of 3 possible correlation matrices with real elements. In order to choose one of the 3 correlation matrices we need to decide whether we are in a low, medium or high correlation scenario. This can be done by numerically computing the TX and RX correlation coefficients in (16) as (for the estimator in (21) only the receive correlation coefficient is needed)

$$\hat{\rho}_{ij}^T = E\{\hat{h}_{in}^t (\hat{h}_{jn}^t)^*\} = E\{\hat{h}_{in}^f (\hat{h}_{jn}^f)^*\}, \hat{\rho}_{ij}^R = E\{\hat{h}_{mi}^t (\hat{h}_{mj}^t)^*\} = E\{\hat{h}_{mi}^f (\hat{h}_{mj}^f)^*\} \quad (25)$$

where $E\{.\}$ is the expectation value, $h_{in}$, $h_{jn}$ are channel coefficients, and $(h)^*$ is the complex value of h.

For example, the 3 correlation matrices for $R_T$ and $R_R$ (cf. Eq. (15)) could be as follows.

$$R_T = \begin{bmatrix} 1 & 0.9 \\ 0.9 & 1 \end{bmatrix}, \begin{bmatrix} 1 & 0.3 \\ 0.3 & 1 \end{bmatrix}, \text{ or } \begin{bmatrix} 1 & 0 \\ 0 & 1 \end{bmatrix},$$

$$R_R = \begin{bmatrix} 1 & 0.9 \\ 0.9 & 1 \end{bmatrix}, \begin{bmatrix} 1 & 0.3 \\ 0.3 & 1 \end{bmatrix}, \text{ or } \begin{bmatrix} 1 & 0 \\ 0 & 1 \end{bmatrix},$$

The values of the matrix elements are selected according to a comparison of the calculated correlation coefficients with threshold values. In the above example, if ρ is measured to be above 0.9, then a value of 0.9 is selected, if ρ is measured to be between 0.3 and 0.9, then a value of 0.3 is selected, and if ρ is measured to be below 0.3, then a value of 0 is selected in which case the correlation matrix is the unity matrix. If both $R_T$ and $R_R$ are found to be the unity matrix, then also $C_{MIMO}$ and $Q_{MIMO}$ are the unity matrix (cf. eqs. (13), (14), (27) and (28)). Of course, the threshold values can be chosen differently and there can be more than 3 different pre-defined correlation matrices for $R_T$ and $R_R$.

The correlation coefficients in (25) are those to be used in the scenario detection step. Note that another advantage of the robust approach is that the channel estimator matrix Q can be pre-computed once the SNR and the level of correlation at the RX and TX antenna are known. As mentioned above, better performance can be achieved if a finer resolution is used for the correlation coefficient when it comes to choose the MMSE estimation matrix (and after the scenario detection step has been carried out).

2c) MIMO/SIMO Case (Frequency Domain)

The frequency domain variant of the approached in above Sections 2a and 2b leads to the simpler expressions for the MIMO and SIMO channel estimators. Collecting $N_W$ pilots in the vector z (and stacking the transmit/receive (MIMO) or the receive vectors only (SIMO) as in above Sections 2a and 2b), we obtain:

$$\hat{h}_f = Qz = C(C + \sigma^2 I)^{-1} z \qquad (26)$$

where C is a block diagonal correlation matrix with a similar structure as before, i.e.:

$$C = C_{MIMO} = \begin{bmatrix} R_T \otimes R_R & & \\ & \ddots & \\ & & R_T \otimes R_R \end{bmatrix} \qquad (27)$$

for the MIMO case and $$C = C_{SIMO} = \begin{bmatrix} R_R & & \\ & \ddots & \\ & & R_R \end{bmatrix} \qquad (28)$$

for the SIMO case.

Note that the dimension of C is $4N_w \times 4N_w$ for the MIMO case and $2N_w \times 2N_w$ for the SIMO case. Note that $N_w$ could be set to the overall number of pilots, $N_p$, for the given bandwidth or to smaller windows. Moreover, the windows could be partly overlapping (sliding window approach) or adjacent depending on the desired complexity and performance.

In general, note that the above proposed procedures can easily be extended to any number of RX and TX antennas.

2d) SISO Case (Frequency Domain)

If a low correlation scenario is detected one could decide to proceed with the conventional LS approach, however, in order to improve performance we follow a similar approach to the MIMO case, this time exploiting the frequency correlation between pilots at a specific receive antenna. The signal model becomes (dropping the antenna indices):

$$z = \begin{bmatrix} h(k_0) \\ h(k_1) \\ \vdots \\ h(k_{N_W-1}) \end{bmatrix} + \begin{bmatrix} n(k_0) \\ n(k_1) \\ \vdots \\ n(k_{N_W-1}) \end{bmatrix} = h + n \qquad (29)$$

where h is directly the vector of the frequency domain samples at the pilot sub-carriers $k_i$. The expression of the MMSE estimator will be:

$$\hat{h}_f = Q_{SISO} z = C_{SISO} (C_{SISO} + \sigma^2 I)^{-1} z \qquad (30)$$

In practice, for large bandwidths and thus for large number of pilots ($N_p > 25$), smaller windows $N_W$ are taken in (29) and then processed in (30). For our preliminary investigations we used adjacent (i.e. non-overlapping windows) of 16 pilots. These windows can be adjacent or overlapping (sliding window). Again, in a robust formulation of the problem, the correlation matrix in (30) will be pre-computed modeling the power delay profile as constant over time with duration equal to the cyclic prefix. The entries of $C_{SISO}$ will then be obtained as:

$$C_{SISO}(i,j) = si(2\pi \tau_{max} \Delta F(i-j)), i=1, \ldots, N_W \qquad (31)$$

where si is the sinc function, while ΔF and $\tau_{max}$ denote, respectively, the sub-carrier spacing and the delay spread of the channel, typically set to the largest value allowed, i.e. the cyclic prefix length $T_{CP}$. It is seen that the resulting matrix $Q_{SISO}$ can be pre-computed of line for different SNR levels. Finally, as for SIMO/MIMO, the window length $N_W$ could be set to the overall number of pilots, $N_p$, for the given bandwidth or to a smaller window. Moreover, windows could be partly overlapping (sliding window approach) or adjacent depending on the desired complexity and performance.

At this point a few comments should be made in the following. As mentioned above, the choice between a frequency and a time domain approach depends on the desired complexity/performance tradeoff. The following can be observed:

1) For the MIMO-FD and SIMO-FD approaches the number of equations and the number of unknowns scale linearly with the number of pilots. Thus, no matter how large the window size $N_W$ is chosen, the resulting performance remains the same.
2) If the delays of the multipath components are available (after a preliminary estimation of the channel impulse response), this knowledge can be incorporated in the matrix D in (8) and (19), reducing the number of unknowns in the TD case and leading to improved performance.
3) For the MIMO-TD and SIMO-TD approaches without knowledge of the exact channel delays the number of unknowns grows linearly with L, while the number of equations grows linearly with the window size $N_W$. If the window size (i.e. the number of pilots) is thus significantly larger than L, the algorithms TD benefit from a noise averaging effect with respect to the FD approaches. On the contrary, if the number of channel taps is significantly larger than the number of pilots a performance degradation with respect to the MIMO-/SIMO-FD approaches can be expected.
4) If the delays of the channel are known and the number of taps with significant energy is small the performance of the TD approaches is significantly better compared to the FD approaches (assuming the same number of pilots). However, as the delays are usually not known in advance the matrix Q has to be computed in real time leading to a significant increase in complexity.

5) Also the SISO-FD algorithm can be scaled by adjusting the window size which should be chosen according to the expected coherence time of the channel. If this information is not available the robust approach proposed above (cycle prefix length) is a viable option.

Figure 6:
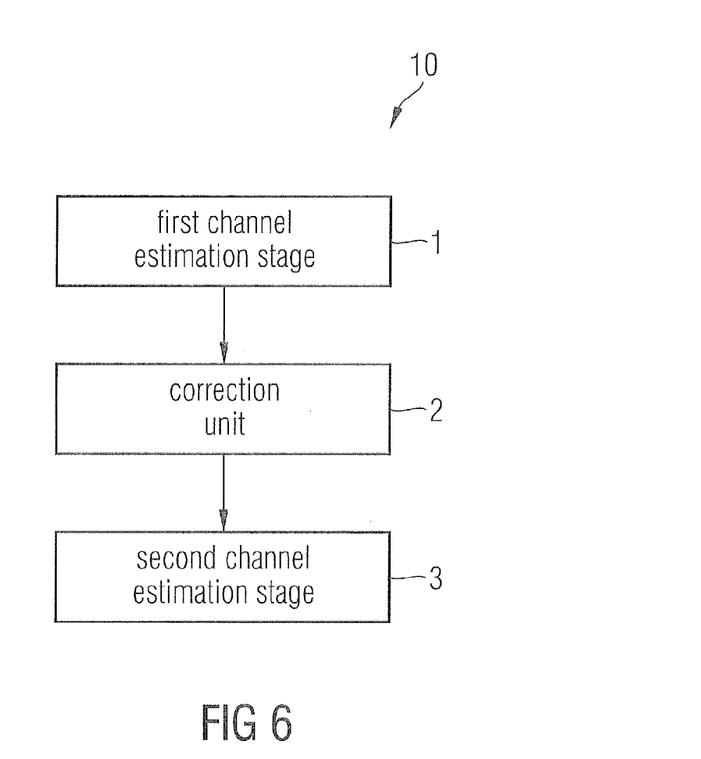
FIG. 6 shows a schematic block representation of a channel estimator according to an embodiment.

Referring to FIG. 6, there is shown a schematic block representation of a channel estimator according to an embodiment. The channel estimator 10 comprises a first channel estimation stage 1 configured to determine first channel estimates at pilot symbol positions of pilot symbols in a symbol-carrier matrix of a received signal. The channel estimator 10 further comprises a correction unit 2 configured to correct the first channel estimates at the pilot symbol positions using Bayesian estimation, and a second channel estimation stage 3 configured to determine second channel estimates at symbol positions other than the pilot symbol positions using interpolation based on the corrected first channel estimates.

According to an embodiment of the channel estimator 10, the selection unit 2 is configured to select a spatial correlation matrix out of a set of predefined spatial correlation matrices and supply the selected spatial correlation matrix to the correction unit 3. This embodiment will be particularly required in the case of a transmission system comprising at least two transmission antennas or at least two reception antennas so that spatial correlations between the at least two transmission antennas or the at least two reception antennas can be exploited for improving the first channel estimates at the pilot symbol positions. According to a further embodiment thereof, the channel estimator 10 further comprises a calculation unit configured to calculate correlation coefficients representing spatial correlations between the at least two transmission antennas and/or the at least two reception antennas and supply the calculated correlation coefficients to the selection unit.

According to an embodiment of the channel estimator 10, the channel estimator 10 further comprises a selection unit configured to select a frequency correlation matrix out of a set of predefined frequency correlation matrices and supply the selected frequency correlation matrix to the correction unit 2. This embodiment will be particularly required in the case of a transmission system comprising only one transmission antenna and only one reception antenna in which case the frequency correlations between the pilot symbols can be exploited. According to a further embodiment thereof, the channel estimator 10 further comprises a calculation unit configured to calculate a signal-to-noise ratio of the received signal and supply the calculated signal-to-noise ratio to the selection unit.

Figure 7:
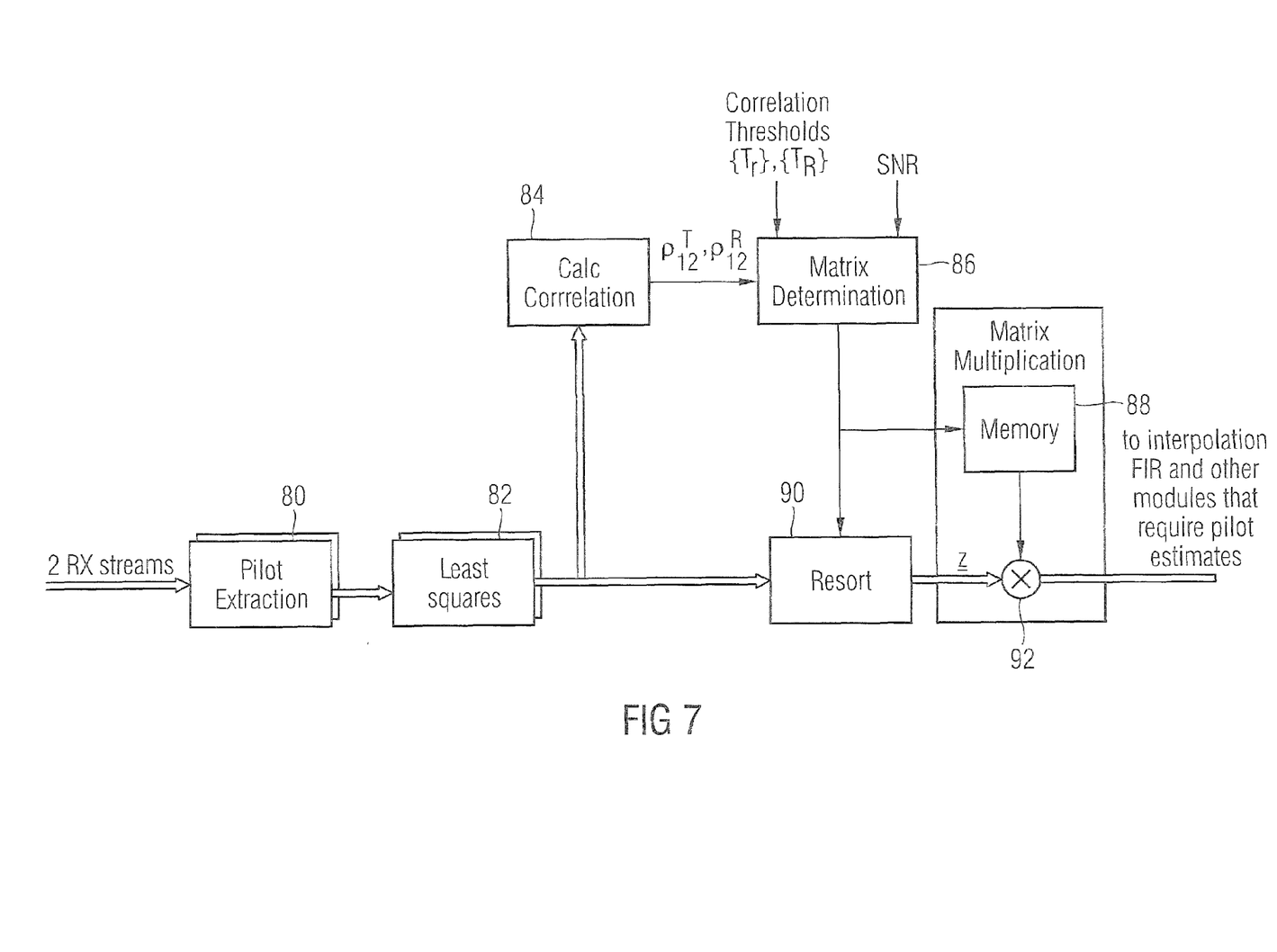
FIG. 7 shows a schematic block representation of a channel estimator according to an embodiment.

Referring to FIG. 7, there is shown a schematic block representation of a channel estimator according to an embodiment.

The two RX streams from RX antenna 1 and RX antenna 2 (not shown) are fed into a pilot extraction block 80 that extracts from both streams the received samples belonging to a pilot transmission. After demodulating the received pilot signals the TX and/or RX correlations are calculated in the module "Calc Correlation" 84 that numerically computes the correlation based on $$\rho_{12}^R = \frac{1}{N_1} \sum_{k \in P_1} z_{11}(k) z_{21}^*(k) + \frac{1}{N_1} \sum_{k \in P_1} z_{12}(k+3) z_{22}^*(k+3) \quad (32)$$

-continued
$$\rho_{12}^T = \frac{1}{N_1} \sum_{k \in P_1} z_{11}(k) z_{21}^*(k+3) + \frac{1}{N_1} \sum_{k \in P_1} z_{12}(k) z_{22}^*(k+3)$$

where $P_1$ is the set of pilots from one antenna in one OFDM reference symbol from one TX antenna. The cardinality of the set $P_1$ is $N_1$. It is important to keep in mind that the LTE specific pilot grid has a distance of 3 sub-carriers between pilots from the two different TX antennas.

Referring to FIG. 5, there is shown a schematic representation of a 2×2 antenna configuration. It is to be noted that the spatial correlations between the reception antennas tries to identify the correlation between $h_{11}$ and $h_{21}$ as shown in FIG. 5. Similarly, one could also take the correlation between $h_{22}$ and $h_{21}$. In the same way the spatial correlation between the transmission antennas tries to identify the correlation between $h_{11}$ and $h_{12}$, but one could also take the correlation between $h_{22}$ and $h_{12}$. In the above equation (32) both possibilities are taken into account by averaging over both results.

The scenario detector (or matrix determinator) 86 takes the numerically computed correlations $\rho_{12}^T, \rho_{12}^R$ as an input and compares these estimates to a set of thresholds for the TX and RX correlations $\{T_T\}$ and $\{T_R\}$ of cardinalities $N_T$ and $N_R$.

Depending on the result of these comparisons and possibly the SNR provided from a SNR estimator the scenario detector 86 makes a choice between the SISO, SIMO, and the MIMO case and selects the appropriate matrix Q to be used in the matrix multiplication step from a memory 88. In order to determine what scenario to be selected $(N_T+N_R)$ comparisons have to be carried out by the scenario detector 86.

Based on the chosen scenario the "Resort" module 90 composes the demodulated pilot vector z. The scenario detector 86 also outputs an offset address pointer which selects the corresponding matrix to be multiplied with the demodulated pilot vector z from the memory 88. The selected matrix is then multiplied with the demodulated pilot vector z at 92.

What is claimed is:

1. A method of channel estimation for a multiple carrier radio transmission system, comprising:
    receiving a signal comprising a symbol-carrier matrix, the symbol-carrier matrix comprising a predetermined pattern of pilot symbols;
    determining first channel estimates at pilot symbol positions of the pilot symbols in the symbol-carrier matrix;
    correcting the first channel estimates at the pilot symbol positions using Bayesian estimation; and
    determining second channel estimates at symbol positions other than the pilot symbol positions by means of interpolation based on the corrected first channel estimates.

2. The method according to claim 1, wherein the Bayesian estimation comprises minimum mean square estimation.

3. The method according to claim 1, wherein the transmission system comprises at least two transmission antennas or at least two reception antennas, the method further comprising:
    selecting a spatial correlation matrix out of a set of predefined spatial correlation matrices, and
    employing the selected spatial correlation matrix in the Bayesian estimation.

4. The method according to claim 3, further comprising:
    calculating correlation coefficients representing spatial correlations between the at least two transmission antennas or the at least two reception antennas, or both.

5. The method according to claim 4, further comprising:
    selecting the spatial correlation matrix based on the calculated correlation coefficients.

6. The method according to claim 5, further comprising:
selecting the spatial correlation matrix based on whether the calculated correlation coefficients are above or below one or more predetermined threshold values.

7. The method according to claim 4, further comprising:
determining a spatial correlation matrix based on the calculated correlation coefficients, and
selecting a smaller spatial correlation matrix according to a desired complexity of the Bayesian estimation.

8. The method according to claim 3, wherein the spatial correlation matrix comprises the form $$C_{MIMO} = \mathrm{diag}(R_{T,0} \otimes R_{R,0}, \ldots, R_{T,L-1} \otimes R_{R,L-1})$$
$$= \begin{bmatrix} R_T \otimes R_R & & \\ & \ddots & \\ & & R_T \otimes R_R \end{bmatrix}$$

wherein $$R_T = \begin{bmatrix} \rho_{11}^T & \rho_{12}^T \\ \rho_{21}^T & \rho_{22}^T \end{bmatrix}, R_R = \begin{bmatrix} \rho_{11}^R & \rho_{12}^R \\ \rho_{21}^R & \rho_{22}^R \end{bmatrix}$$

wherein $\rho_{ij}^T$ is the correlation coefficient between the i-th and j-th transmission antenna, and $\rho_{ij}^R$ is the correlation coefficient between i-th and j-th reception antenna.

9. The method according to claim 8, further comprising:
correcting the first channel estimates according to the following equations:

$$\hat{h}_t = Q_{MIMO} z = C_{MIMO} D^H (D C_{MIMO} D^H + \sigma^2 I)^{-1} z$$

wherein $\hat{h}_t$ is the time domain channel estimate, $\sigma^2$ is the noise power, I is the unity matrix, and $$z = \begin{bmatrix} z(k_0, k_0 + 3) \\ \vdots \\ z(k_{N_w-1}, k_{N_w-1} + 3) \end{bmatrix} = D h_t + n$$

and $$D = \begin{bmatrix} D(k_0, k_0 + 3) \\ \vdots \\ D(k_{N_w-1}, k_{N_w-1} + 3) \end{bmatrix}, n = \begin{bmatrix} n(k_0, k_0 + 3) \\ \vdots \\ D(k_{N_w-1}, k_{N_w-1} + 3) \end{bmatrix}$$

wherein $k_i$ indicate the pilot sub-carriers of a first transmission antenna and $k_{i+3}$ indicates the pilot sub-carriers of a second transmission antenna.

10. The method according to claim 3, further comprising:
predefining the set of spatial correlation matrices and storing the spatial correlation matrices and their inverse matrices, respectively, in a memory.

11. The method according to claim 1, wherein the transmission system comprises only one transmission antenna and only one reception antenna, the method further comprising:
selecting a frequency correlation matrix out of a set of predefined frequency correlation matrices, and
employing the selected frequency correlation matrix in the Bayesian estimation.

12. The method according to claim 11, further comprising:
calculating a signal-to-noise ratio of the received signal.

13. The method according to claim 12, further comprising:
selecting the frequency correlation matrix based on the determined signal-to-noise ratio.

14. The method according to claim 13, further comprising:
selecting the frequency correlation matrix based on whether the calculated signal-to-noise ratio is above or below one or more predetermined threshold values.

15. The method according to claim 11, wherein the frequency correlation matrix comprises the form $$C_{SISO}(i,j) = \mathrm{si}(2\pi \tau_{max} \Delta F(i-j)), i=1, \ldots, N_W$$

wherein si is the sinc function, $\Delta F$ is the sub-carrier spacing, $\tau_{max}$ is the delay spread of the channel, i and j are pilot indices, and $N_W$ is a predefined maximum pilot index.

16. The method according to claim 15, further comprising:
correcting the first channel estimates according to the following:

$$\hat{h}_f = D \cdot Q_{MIMO} z = C_{SISO}(C_{SISO} + \sigma^2 I)^{-1} z$$

wherein $\hat{h}_f$ is the frequency domain channel estimate, $\sigma^2$ is the noise power, I is the unity matrix, and $$z = \begin{bmatrix} h(k_0) \\ h(k_1) \\ \vdots \\ h(k_{N_w-1}) \end{bmatrix} + \begin{bmatrix} n(k_0) \\ n(k_1) \\ \vdots \\ n(k_{N_w-1}) \end{bmatrix} = h + n$$

wherein h is the factor of the frequency domain samples at the pilot sub-carriers $k_i$.

17. The method according to claim 1, further comprising:
determining the first channel estimates using least squares estimation.

18. The method according to claim 1, further comprising:
determining the second channel estimates using Bayesian estimation.

19. The method according to claim 18, wherein Bayesian estimation comprises minimum mean square estimation.

20. A channel estimator for a multiple carrier radio transmission system, comprising:
a first channel estimation stage configured to determine first channel estimates at pilot symbol positions of pilot symbols in a symbol-carrier matrix of a received signal;
a correction unit configured to correct the first channel estimates at the pilot symbol positions using Bayesian estimation; and
a second channel estimation stage configured to determine second channel estimates at symbol positions other than the pilot symbol positions by means of interpolation based on the corrected first channel estimates.

21. The channel estimator according to claim 20, wherein the transmission system comprises at least two transmission antennas or at least two reception antennas, the channel estimator further comprising:
a selection unit configured to select a spatial correlation matrix out of a set of predefined spatial correlation matrices and supply the selected spatial correlation matrix to the correction unit.

22. The channel estimator according to claim 21, further comprising:
a calculation unit configured to calculate correlation coefficients representing spatial correlations between the at least two transmission antennas or the at least two reception antennas, or both, and supply the calculated correlation coefficients to the selection unit.

23. The channel estimator according to claim 21, further comprising:

a storing unit coupled to the selection unit and configured to store the set of predefined frequency correlation matrices.

24. The channel estimator according to claim 20, wherein the transmission system comprises only one transmission antenna and only one reception antenna, the channel estimator further comprising:
a selection unit configured to select a frequency correlation matrix out of a set of predefined frequency correlation matrices and supply the selected frequency correlation matrix to the correction unit.

25. The channel estimator according to claim 24, further comprising:
a calculation unit configured to calculate a signal-to-noise ratio of the received signal and supply the calculated signal-to-noise ratio to the selection unit.

26. The channel estimator according to claim 24, further comprising:
a storing unit coupled to the selection unit and configured to store the set of predefined frequency correlation matrices.

27. A method of channel estimation for a multiple carrier radio transmission system, wherein the transmission system comprises at least two transmission antennas or at least two reception antennas, comprising:
receiving a signal comprising a symbol-carrier matrix, the symbol-carrier matrix comprising a predetermined pattern of pilot symbols;
determining first channel estimates at pilot symbol positions of the pilot symbols in the symbol-carrier matrix;
correcting the first channel estimates at the pilot symbol positions using Bayesian estimation;
determining second channel estimates at symbol positions other than the pilot symbol positions by means of interpolation based on the corrected first channel estimates;
selecting a spatial correlation matrix out of a set of predefined spatial correlation matrices, and
employing the selected spatial correlation matrix in the Bayesian estimation.

28. A channel estimator for a multiple carrier radio transmission system, wherein the transmission system comprises at least two transmission antennas or at least two reception antennas, comprising:
a first channel estimation stage configured to determine first channel estimates at pilot symbol positions of pilot symbols in a symbol-carrier matrix of a received signal;
a correction unit configured to correct the first channel estimates at the pilot symbol positions using Bayesian estimation;
a second channel estimation stage configured to determine second channel estimates at symbol positions other than the pilot symbol positions by means of interpolation based on the corrected first channel estimates; and
a selection unit configured to select a spatial correlation matrix out of a set of predefined spatial correlation matrices and supply the selected spatial correlation matrix to the correction unit.

* * * * *

UNITED STATES PATENT AND TRADEMARK OFFICE
CERTIFICATE OF CORRECTION

PATENT NO. : 8,605,804 B2
APPLICATION NO. : 13/085619
DATED : December 10, 2013
INVENTOR(S) : Cecilia Carbonelli et al.

Page 1 of 1

It is certified that error appears in the above-identified patent and that said Letters Patent is hereby corrected as shown below:

In the Claims:

Column 15, claim 9, line 45; please replace equation

" $D = \begin{bmatrix} D(k_0, k_0 + 3) \\ \vdots \\ D(k_{N_w-1}, k_{N_w-1} + 3) \end{bmatrix}, \quad n = \begin{bmatrix} n(k_0, k_0 + 3) \\ \vdots \\ D(k_{N_w-1}, k_{N_w-1} + 3) \end{bmatrix}$ " with equation -- $D = \begin{bmatrix} D(k_0, k_0 + 3) \\ \vdots \\ D(k_{N_w-1}, k_{N_w-1} + 3) \end{bmatrix}, \quad n = \begin{bmatrix} n(k_0, k_0 + 3) \\ \vdots \\ n(k_{N_w-1}, k_{N_w-1} + 3) \end{bmatrix}$ --

Column 16, claim 16, line 18; please replace equation

" $\hat{h}_f = D \cdot Q_{mimo} z = C_{SISO}(C_{SISO} + \sigma^2 I)^{-1} z$ " with equation -- $\hat{h}_f = Q_{SISO} z = C_{SISO}(C_{SISO} + \sigma^2 I)^{-1} z$ --

Signed and Sealed this
Eleventh Day of February, 2014

Michelle K. Lee
*Deputy Director of the United States Patent and Trademark Office*